United States Patent [19]

Haluska

[11] Patent Number: 4,745,205

[45] Date of Patent: May 17, 1988

[54] NOVEL PRECERAMIC POLYMERS DERIVED FROM CYCLIC SILAZANES AND HALOGENATED DISILANES AND A METHOD FOR THEIR PREPARATION

[75] Inventor: Loren A. Haluska, Midland, Mich.

[73] Assignee: Dow Corning Corporation, Midland, Mich.

[21] Appl. No.: 926,145

[22] Filed: Nov. 3, 1986

[51] Int. Cl.$^4$ .............................................. C07F 7/08
[52] U.S. Cl. .................................................... 556/412
[58] Field of Search ........................................ 556/412

[56] References Cited

U.S. PATENT DOCUMENTS

| 4,482,669 | 11/1984 | Seyferth et al. | 556/412 X |
| 4,482,689 | 11/1984 | Haluska | 556/412 X |
| 4,540,803 | 9/1985 | Cannady | 556/412 |

*Primary Examiner*—Paul F. Shaver
*Attorney, Agent, or Firm*—Robert L. McKellar

[57] ABSTRACT

Novel polymethyl(disilyl)silazanes are prepared from cyclic silazanes and certain halogenated disilanes. Thus, the reaction of a mixture of $\{(CH_3)_2SiNH\}_x$, where x is 3 and 4, and halogenated mixed disilanes give one of the inventive products.

10 Claims, No Drawings

NOVEL PRECERAMIC POLYMERS DERIVED FROM CYCLIC SILAZANES AND HALOGENATED DISILANES AND A METHOD FOR THEIR PREPARATION

BACKGROUND OF INVENTION

This invention deals with new and novel polymethyl (disilyl)silazanes. a method for their preparation, their use to prepare ceramic materials, and the ceramic materials prepared thereby. Said invention resides in the use of certain cyclic silazanes, or mixtures of them, as co-reactants with halogen-containing disilanes to give the unique polymethyl(disilyl)silazane polymers.

Since about 1975, there has been a renewed effort in the synthesis of preceramic polymers owing to the fact that such polymers have handling properties which allow the formation of shapes and forms prior to ceramification. Thus, several different methods have been developed and disclosed for the preparation of polymethyl(disilyl) silazane polymers that can be converted to silicon nitride-containing ceramics and other related materials.

The first reported method is that disclosed by Gaul, in U.S. Pat. No. 4,340,619, issued July 20, 1982 in which he obtained ceramics materials by pyrolysis of preceramic polymers, which polymers were prepared by reacting chlorine-containing disilanes and disilazanes. These polymers were pyrolyzable to silicon-carbonitride Si-C-N ceramics and prior to pyrolysis, the polymers were capable of being handled i.e. shaped or molded and thus one could form such things as fibers from such polymers.

Other polymer precursors for forming silicon nitride ceramics have been described. Verbeek in U.S. Pat. No. 3,853,567 issued on Dec. 10, 1974 discloses the reaction of methyltrichlorosilane reacted with methylamine to form methyltris(methylamino)silane. This product could be heated to form a polymer at 520° C. The polymers could be cured by moist air oxidation at 110° C. and then pyrolyzed to afford a low yielding Si-C-N-O ceramic. Similar materials and techniques were disclosed by Verbeek. et. al. in U.S. Pat. No. 3,892,583, issued July 1, 1975.

Gaul, in U.S. Pat. No. 4,321,970, issued Jan. 26, 1982, discloses the preparation of polysilazane polymers that were synthesized by reacting various alkyltrichlorosilanes with hexamethyldisilazane ({(CH$_3$)$_3$Si}$_2$NH). In this synthesis, (CH$_3$)$_3$SiCl was eliminated as a by-product. These materials could be pyrolyzed at high temperatures to form Si-C-N containing ceramics.

Cannady in U.S. Pat. No. 4,543,344, issued July 3, 1985, described a modification to Gaul's process to include the preparation of a polyhydridomethylsilazane polymer from trichlorosilane and hexamethyldisilazane, the same inventor in U.S. Pat. No. 4,540,803, issued Sept. 10, 1985 showed that these polymers were capable of being pyrolyzed to Si-C-N type ceramics.

Additional polymers have been developed and disclosed by Gaul in U.S. Pat. No. 4,395,460, issued July 26, 1983; U.S. Pat. No. 4,404,153, issued Sept. 13, 1983; Haluska in U.S. Pat. No. 4,482,689, issued Nov. 13, 1984; Seyferth et al., in U.S. Pat. No. 4,397,828, issued Aug. 9, 1983; Cannady in U.S. Pat. No. 4,535,007 issued Aug. 13, 1985; Bujalski, U.S. patent application Ser. No. 653,003, filed Sept. 21, 1984; Baney et al., U.S. patent application Ser. Nos. 652,938, filed Sept. 21, 1984 and 653,939, filed Sept. 21, 1984.

What has been discovered are new and novel preceramic polymers, methods for their preparation, their use to prepare ceramic materials and the ceramic materials prepared using such preceramic polymers.

THE INVENTION

This invention relates to a method of preparing a preceramic polymer comprising contacting and reacting in an inert, essentially anhydrous atmosphere, a chlorine-containing disilane or a mixture of chlorine-containing disilanes, of the general formula

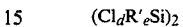

$(Cl_dR'_eSi)_2$ with a cyclic silazane, or a mixture of cyclic silazanes selected from the group consisting of cyclic silazanes having the general formula (i) (CH$_3$R"SiNH)$_x$ and (ii) (C$_6$H$_5$R"SiNH)$_x$, at a temperature in the range of 22° C. to 280° C. while distilling by-produced volatile products, wherein R' and R" are each independently selected from the group consisting of hydrogen, vinyl, phenyl and alkyl radicals containing 1 to 3 carbon atoms; d has a value of 0.5 to 3; e has a value of 0 to 2.4 and the sum of (d+e) is equal to three and x is an integer of 3 to 6.

This invention further comprises the method by which the product obtained by such a preparative method is further treated with ammonia to reduce residual halide in such a polymer.

Also, this invention deals with the products produced by the preparative method for the preceramic polymers and the products produced by the ammonia treatment of such polymers.

In addition, this invention deals with a method of forming a ceramic material, which method comprises pyrolyzing the preceramic polymer or the ammonia treated, preceramic polymer at elevated temperatures, in a vacuum, or an inert atmosphere, until the preceramic polymer or the ammonia treated preceramic polymer is converted to a ceramic material.

Finally, this invention deals with the ceramic compositions prepared by pyrolyzing the inventive compositions herein.

The preceramic polymers of this invention, including those not treated with ammonia, have improved flow characteristics over those materials of the prior art.

Thus, the preparations of the new polymers involves the reaction of (CH$_3$R"SiNH)$_x$, (C$_6$H$_5$R"SiNH)$_x$, or a mixture of cyclic silazanes, with halodisilanes such as Cl$_2$CH$_3$SiSiCH$_3$Cl$_2$ to eliminate RR"SiCl$_2$, where R' and R" are individually methyl or phenyl, as a by-product during the polymerization reaction to form the preceramic polymer. The remaining halide substitution on silicon can then be removed by reacting with gaseous ammonia.

Generally the reaction of the disilanes and cyclic silazanes is carried out in the presence of a solvent such as toluene. The solvent is not critical as any organic solvent that allows the compatibility of the reactants, without reacting with the disilanes or cyclic silazanes, can be used in this invention. Generally, since the initial reaction is exothermic, it is desirable to cool the reaction vessel as the reaction proceeds. Although it is not essential, it is preferred to add the disilanes to the cyclic silazanes wherein the silazanes are cooled, such as by an ice water bath.

The amount of disilanes that can be reacted with the cyclic silazane is based on the stoichiometry of the total available halide in the polysilanes and the total available reactive nitrogen in the cyclic silazanes, thus, preferred for this inventive method is a ratio of 1-Si-Si to 2 $\{(CH_3)_2SiNH\}_x$. Other ratios of disilane to $\{(CH_3)_2SiNH\}_x$ can be used that are higher or lower than this ratio as long as the final product is soluble in organic solvents such as, for example, toluene, n-heptane, etc.

The reaction mass should be essentially dry, as water tends to interfere with the desired result. After the disilane has been added to the cyclic silazane and the initial exotherm has subsided, the cooling source is removed and the reaction is allowed to proceed at or near room temperature for a period of one to several hours depending on the disilanes and cyclic silazanes used in the reaction. The reaction mass is then strip distilled to remove volatile by-products and to form the polymers. Preferred for this invention are strip temperatures in the range of 22° C. to 280° C. The polymers so-formed can then be filtered, stored, or treated with gaseous ammonia to reduce the residual halide content. Further, it is appropriate to refilter the polymer after the gaseous ammonia treatment to remove the solid $NH_4Cl$ that forms therein.

The polymers range from solids to liquids and are light to dark yellow in color.

The disilanes useful in this invention are those having the general formula $(Cl_dR'_eSi)_2$ wherein R is hydrogen, vinyl, phenyl and alkyl radicals containing 1 to 3 carbon atoms. Thus, the R' groups can all be the same or they can be different. The disilanes can be those found in the residue from the direct process for producing halosilanes (Eaborn. C., "Organosilicon Compounds", Butterworth Scientific Publications, London, 1960, pg. 1). The direct process is the reaction between silicon metal and aliphatic halides, generally methyl chloride, at elevated temperature in the presence of a catalyst, generally copper, to produce organo- chlorosilanes. For the chlorine-containing disilanes described above, the value of d is 0.5 to 3 and the value of e is from 0 to 2.4, and the sum of (d+e) is equal to three. Examples of chlorine-containing disilanes are $\{Cl(CH_3)_2Si\}_2$, $\{Cl_2CH_3Si\}_2$, $\{Cl_2CH_2=CHSi\}_2$, $\{Cl_2C_2H_5Si\}_2$ and $\{Cl(C_6H_5)_2Si\}_2$.

The cyclic silazanes useful in this invention are those having the general formulae (i) $(CH_3R''SiNH)_x$ and (ii) $(C_6H_5R''SiNH)_x$ wherein R'' is selected from the group consisting of hydrogen, vinyl, phenyl and alkyl radicals containing 1 to 3 carbon atoms and x has a value of 3, 4, 5 or 6. Preferred for this invention are those cyclic silazanes wherein x has a value of 3 or 4 and R'' is methyl, vinyl or phenyl. Most preferred are those cyclic silazanes wherein x has a value of 4 and R'' is methyl.

Mixtures of cyclic silazanes can be used. By "mixture", it is meant for purposes of this invention that the cyclics can be mixtures wherein x has the value of 3 and 4, or x has a value 3, 4, and 5, etc. Generally, the cyclic silazanes are used in such mixtures wherein the cyclic tetramer pre- dominates. that is, the cyclic tetramer is present in the mixture in more than fifty weight percent. "Mixtures" can also mean, for example, cyclic tetramer having different substituents on silicon can be used. For example, $\{(CH_3)_2SiNH\}_4$ and $\{(CH_3)(CH_2=CH)SiNH\}_4$ can be used together to give mixed polymers.

This invention also deals with a method of preparing ceramic materials, the method comprising heating a preceramic polymer which has been prepared by contacting and reacting in an inert, essentially anhydrous atmosphere, a chlorine-containing disilane or a mixture of chlorine-containing disilanes, of the general formula $(Cl_dR'_eSi)_2$, with a cyclic silazane, or a mixture of cyclic silazanes selected from the group consisting of cyclic silazanes having the general formula (i) $(CH_3R''SiNH)_x$ and (ii) $(C_6H_5R''SiNH)_x$ at a temperature in the range of 22° C. to 280° C. while distilling by-produced volatile products, wherein R' and R'' are each independently selected from the group consisting of hydrogen, vinyl, phenyl and alkyl radicals containing 1 to 3 carbon atoms; d has a value of 0.5 to 3; e has a value of 0 to 2.4 and the sum of (d+e) is equal to three and x is an integer of 3 to 6, in an inert atmosphere or vacuum to a temperature of at least 750° C. until said preceramic polymer is converted to a ceramic material.

Further, this invention deals with a method of preparing ceramic materials wherein a preceramic polymer is prepared by (I) contacting and reacting in an inert, essentially anhydrous atmosphere, a chlorine-containing disilane or a mixture of chlorine-containing disilanes, of the general formula $(Cl_dR'_eSi)_2$ with a cyclic silazane, or a mixture of cyclic silazanes selected from the group consisting of cyclic silazanes having the general formula (i) $(CH_3R''SiNH)_x$ and (ii) $(C_6H_5R''SiNH)_x$ at a temperature in the range of 22° C. to 280° C. while distilling by produced volatile products, wherein R' and R'' are each independently selected from the group consisting of hydrogen, vinyl, phenyl and alkyl radicals containing 1 to 3 carbon atoms; d has a value of 0.5 to 3; e has a value of 0 to 2.4 and the sum of (d+e) is equal to three and x is an integer of 3 to 6.; (II) treating the product from (I) with dry gaseous ammonia at a temperature in the range of 22° C. to 91° C. to remove essentially all residual halide in the product from (I); (III) heating the product from (II) in an inert atmosphere or vacuum to a temperature of at least 750° C. until said preceramic polymer is converted to a ceramic material.

For purposes of this invention, "inert atmosphere" means gases such as argon, nitrogen, helium, $CO_2$ or $H_2$.

Now so that those skilled in the art can more fully understand and appreciate the invention, the following examples are presented. These examples should not be used to limit the scope of this invention as it is delineated in the claims.

EXAMPLE 1

Preparation of Polymethyl (disilyl) Silazane from mixed halogenated disilanes.

A solution of mixed disilanes consisting of 0.046 moles of $Cl(CH_3)_2SiSiCH_3)_2Cl$, 0.1602 moles of $Cl(CH_3)2SiSiCH_3Cl_2$ and 0.1622 moles of $Cl_2CH_3SiSiCH_3Cl_2$ was added to 55.8 grams (0.7635 eq.) of mixed cyclics having the formula $\{(CH_3)_2SiNH\}_3$ and $\{(CH_3)_2SiNH\}_4$ (ratio of 4 to 3 was 60/40 weight percent) in 191 grams of dry n-hexane. The reaction material was stirred for about 1 hour and then strip distilled to 261° C. The weight of distillate was 203.2 grams. Analysis of the distillate by gas chromatograph and % Cl showed it contained 0.191 moles of $(CH_3)_2SiCl_2$ that accounted for 31.3 weight % of the chloride in the disilanes. The residue polymer was dissolved in 250 cc of dry n-heptane and dry ammonia gas was bubbled through the solution for 1 hour and 55 minutes at a temperature ranging from 28° to 55° C. The solution was then filtered and retreated with gaseous ammonia for 2 hours and 50 minutes at a temperature ranging from 22° to 91° to 58° C. The reaction mixture was filtered again and strip distilled to 281° C. to afford a 44.7 gram (32.9 weight % of theory) based on the weights of the starting materials. The material was a clear light yellow solid product. An elemental analysis showed a composition having the following weight percents:

| Element | Weight % |
|---------|----------|
| Si | 32.900 |
| C | 28.800 |
| H | 8.680 |
| N | 15.400 |
| Cl | 0.269 to give a calculated elemental composition of $Si_{1.2}C_{2.4}H_{8.6}N_{1.1}Cl_{0.008}$ |

The molecular weight of the polymer was obtained by gas phase chromatography analysis with the column calibrated against polystyrene corrected against known polymethyl (disilyl) silazane polymer prepared according to Gaul in U.S. Pat. No. 4,340,619. The weight average molecular weight ($\overline{Mw}$) was 3169.

A determination of the softening point of the polymer was made by heating a sample of the polymer at 5° C./minute rate in a DuPont 1090 thermal mechanical analyzer. A softening point of 57° C. was obtained.

EXAMPLE 2

The polymer obtained above was pyrolyzed in the uncured state to 1200° C. in Argon over a period of 3 hr. 30 min. A yield of 39.2 weight % of ceramic char was obtained. Thermogravimetric analysis yielded 41 weight % of ceramic char after pyrolysis to 1000° C. in helium. The weight loss began at 215° C. and finished at about 725° C. X-ray diffraction of the argon pyrolyzed material showed it to be amorphous. The mass absorption coefficient of the ceramic was 39.6.

An elemental analysis of the ceramic pyrolyzed in Argon afforded the following results:

| Element | Weight % |
|---------|----------|
| Si | 55.50 |
| C | 20.40 |
| N | 19.80 |
| O | 2.72 to give a calculated composition of $Si_{2.0}C_{1.7}N_{1.4}O_{0.2}$ |

This ceramic had a density of 2.406 g/cc by the Gradient Column Procedure using bromoform and chlorothene in the column.

EXAMPLE 3

Comparison of the inventive compositions and those known in the prior art from U.S. Pat. No. 4,340,619.

A composition was prepared by a procedure using a reaction mixture of 182 gms of methylchlorodisilane and 303.8 gms of hexamethyldisilazane and compared to the material of Example 1 herein. The results can be found on Table 1.

| | POLYMER TYPE | |
|---|---|---|
| Property | From {$(CH_3)_2SiNH$}$_x$ | From {$(CH_3)_3Si$}$_2NH$ |
| Polymer yield based on starting materials | 32.9 | 22 |
| molecular weight ($\overline{Mw}$) | 3169 | 1200 |
| softening point/°C. | 57 | 100 |
| Ceramic yield based on polymer | 41 | 47 |
| X-ray Analysis | Amorphous | Amorphous |
| Mass adsorption Coefficient | 36.4 | 36.7 |
| Ceramic Composition | $Si_{2.0}C_{1.7}N_{1.4}O_{0.2}$ | $Si_{1.9}C_{1.7}N_{1.4}O_{0.1}$ |
| Density | 2.406 | N.A. |

The noticeable differences in the polymer synthesis are polymer yields, molecular weight and softening point. The polymer yield obtained from the inventive polymer process was almost 50% greater than with the comparison material. The molecular weight of the inventive polymer is almost three times higher than the comparative material which leads to better flow characteristics. The softening point of the inventive material is lower than the comparative material but it should be noted that a high enough softening point was retained to allow the material to be useful for spinning fibers and coating micro-electronic circuits. Fibers were easily drawn from the inventive material.

That which is claimed is:

1. A method of preparing a preceramic polymer comprising contacting and reacting in an inert, essentially anhydrous atmosphere, a chlorine-containing disilane or a mixture of chlorine-containing disilanes, of the general formula $(Cl_dR'_eSi)_2$ with a cyclic silazane, or a mixture of cyclic silazanes selected from the group consisting of cyclic silazanes having the general formula (i) $(CH_3R''SiNH)_x$ and (ii) $(C_6H_5R''SiNH)_x$ at a temperature in the range of 22° C. to 280° C. while distilling by produced volatile products, wherein R' and R'' are each independently selected from the group consisting of hydrogen, vinyl, phenyl and alkyl radicals containing 1 to 3 carbon atoms; d has a value of 0.5 to 3; e has a value of 0 to 2.4 and the sum of (d+e) is equal to three and x is an integer of 3 to 6.

2. A method as claimed in claim 1 wherein the disilane is a mixture of chlorine-containing disilanes and the cyclic silazane is {$(CH_3)_2SiNH$}$_x$.

3. A method as claimed in claim 2 wherein x has a value of 4.

4. A method as claimed in claim 2 wherein x has a value of 3.

5. A method as claimed in claim 1 wherein the disilane is a mixture of chlorine-containing disilanes and the cyclic silazanes are a mixture of {$(CH_3)_2SiNH$}$_4$ and {$(CH_3)_2SiNH$}$_3$.

6. A method as claimed in claim 1 wherein the product is further treated with ammonia in an otherwise inert, essentially anhydrous atmosphere.

7. A composition of matter prepared by the method of claim 1.

8. A composition of matter as claimed in claim 7 wherein the disilane is a mixture of chlorine-containing disilanes and the cyclic silazane is {$(CH_3)_2SiNH$}$_x$.

9. A composition of matter as claimed in claim 8 wherein x has a value of 4.

10. A composition of matter as claimed in claim 8 wherein x has a value of 3.

* * * * *